United States Patent
Zu et al.

(10) Patent No.: US 12,202,686 B1
(45) Date of Patent: Jan. 21, 2025

(54) HIGH-RHYTHM AND HIGH-PRECISION 90-DEGREE TURNOVER METHOD

(71) Applicant: SUZHOU SC-SOLAR EQUIPMENT CO., LTD, Suzhou (CN)

(72) Inventors: Guoliang Zu, Suzhou (CN); BinBin Huang, Suzhou (CN); Wenqiang Yao, Suzhou (CN); Yuelong Huang, Suzhou (CN); Hongfeng He, Suzhou (CN)

(73) Assignee: SUZHOU SC-SOLAR EQUIPMENT CO., LTD, Suzhou (CN)

( * ) Notice: Subject to any disclaimer, the term of this patent is extended or adjusted under 35 U.S.C. 154(b) by 0 days.

(21) Appl. No.: 18/770,322

(22) Filed: Jul. 11, 2024

(30) Foreign Application Priority Data

Jan. 12, 2024 (CN) .......................... 202410046528.6

(51) Int. Cl.
*B65G 57/28* (2006.01)

(52) U.S. Cl.
CPC ................................... *B65G 57/28* (2013.01)

(58) Field of Classification Search
CPC ......... B65B 35/22; B65B 35/58; B65B 43/46; B65B 43/52; B65B 57/14; B65B 35/56; B65H 15/02; B65H 15/016; B65H 2301/332; B65H 2301/33216; B65G 47/248; B65G 35/00; B65G 47/82; B65G 57/28; Y10S 414/106; Y10S 414/108; Y10S 414/107
USPC ..... 414/743, 784, 776, 789.9, 927, 928, 929
See application file for complete search history.

(56) References Cited

U.S. PATENT DOCUMENTS

| | | | | | |
|---|---|---|---|---|---|
| 3,042,230 | A | * | 7/1963 | Barski | B65G 47/82 414/400 |
| 3,257,003 | A | * | 6/1966 | Rappl | B65G 57/28 414/931 |
| 3,771,671 | A | * | 11/1973 | Cathers | B65G 1/00 414/789.2 |

(Continued)

FOREIGN PATENT DOCUMENTS

| | | |
|---|---|---|
| CN | 109230407 A | 1/2019 |
| CN | 109928218 A | 6/2019 |

(Continued)

OTHER PUBLICATIONS

Chinese First Office Action; China National Intellectual Property Administration; Chinese Patent Application No. 202410046528.6; 13 pages.

*Primary Examiner* — Gregory W Adams
(74) *Attorney, Agent, or Firm* — Taft Stettinius & Hollister LLP (57) ABSTRACT

A high-rhythm and high-precision 90-degree turnover method including: changing materials; turning a prong over and waiting; driving a first drum conveyor line to move leftward to a turnover station; adjusting front and rear positions of the first drum conveyor line as a whole to make a stacked assembly aligned with a center line of the wooden pallet; driving a first drum conveyor line to move leftward to make a left surface of the stacked assembly abut against a surface of the wooden pallet; driving a prong group to move upward to a second height position to support the stacked assembly; and driving a third support to turn over by 90 degrees reversely to make a second drum conveyor line turned over to a horizontal state.

9 Claims, 5 Drawing Sheets

(56) References Cited

U.S. PATENT DOCUMENTS

| | | | | |
|---|---|---|---|---|
| 3,952,888 | A | * | 4/1976 | Currie .................... B65G 65/00 |
| | | | | 414/400 |
| 6,851,912 | B1 | * | 2/2005 | Zahn ........................ B65G 1/00 |
| | | | | 414/404 |
| 2012/0099956 | A1 | | 4/2012 | Diehr et al. |

FOREIGN PATENT DOCUMENTS

| | | | |
|---|---|---|---|
| CN | 112777281 | A | 5/2021 |
| CN | 213263019 | U | 5/2021 |
| CN | 113787349 | A | 12/2021 |
| CN | 113928620 | A | 1/2022 |
| CN | 218490782 | U | 2/2023 |
| CN | 219313112 | U | 7/2023 |
| CN | 219635568 | U | 9/2023 |
| CN | 219807392 | U | 10/2023 |

* cited by examiner

HIGH-RHYTHM AND HIGH-PRECISION 90-DEGREE TURNOVER METHOD

CROSS-REFERENCE TO RELATED APPLICATION(S)

This application claims priority to Chinese Patent Application No. 202410046528.6 filed Jan. 12, 2024, the disclosure of which is incorporated herein by reference in its entirety.

TECHNICAL FIELD

The present disclosure belongs to the field of photovoltaic assembly packaging technology and, in particular, relates to a high-rhythm and high-precision 90-degree turnover method.

BACKGROUND

After photovoltaic assemblies are assembled, the photovoltaic assemblies need to be packaged in stacks. During the packaging, the stacked photovoltaic assemblies need to be turned over by 90 degrees as a whole to complete the strapping of different dimensions. In the related art, the patent with publication number CN213263019U discloses an automatic turnover apparatus for packing and packaging photovoltaic assemblies. Although the apparatus can implement 90-degree turnover, when an assembly conveyor line is docked to turn over an assembly, a prong needs to be turned over below the assembly conveyor line first, then a stacked assembly enters the to-be-turned-over position on the assembly conveyor line, and then the prong is turned over by 90 degrees. After all assemblies are turned over, and the turned-over assemblies are output from the drum conveyor line on a turnover mechanism, the prong is turned over by 90 degrees to return below the assembly conveyor line before the next stacked assembly can be input. The entire period is time-consuming and inefficient. When the prong carrying the stacked assembly is turned over by 90 degrees on the assembly conveyor line, partial regions of the stacked assembly more adjacent to a turnover shaft are prone to interfering with the conveyor plane of the assembly conveyor line and are locally squeezed by relatively great stress, and there is a risk of hidden breaks in the assembly.

SUMMARY

A high-rhythm and high-precision 90-degree turnover method is provided. The method is implemented based on a preceding high-rhythm and high-precision 90-degree turnover apparatus.

The apparatus includes a first drum conveyor line, a horizontal transfer module, a turnover module, and a position adjustment mechanism.

The first drum conveyor line is configured to input a stacked assembly to be turned over. The stacked assembly is placed on an iron pallet.

The horizontal transfer module configured to drive the first drum conveyor line to move left and right between a receiving station and a turnover station.

The turnover module is configured to turn over the stacked assembly on the first drum conveyor line by 90 degrees at the turnover station. The turnover module includes a hinge base, a third support of which one side is rotatably disposed on the hinge base, a hydraulic cylinder configured to drive the third support to turn over, a second drum conveyor line disposed on the third support, a third motor fixed on the third support, a prong group which is configured to be driven by the third motor to move left and right and to be vertically arranged and interspersed in the second drum conveyor line, and a correction assembly which is disposed on the third support and is configured to correct the position of the wooden pallet on the second drum conveyor line.

The position adjustment mechanism includes a range sensor configured to detect front and rear positions of the stacked assembly on the first drum conveyor line at the turnover station, and a fifth motor configured to adjust front and rear positions of the first drum conveyor line according to the result from the range sensor.

The method includes the steps below.

In S1, the iron pallet which carries the stacked assembly is conveyed in place through the first drum conveyor line, and a position of the stacked assembly is limited.

In S2, when S1 is being carried out, a machine hand clamps a wooden pallet whose surface is paved with a separation plate, the wooden pallet is placed on the second drum conveyor line, and left and right positions and up and down positions of the wooden pallet is corrected through cooperation of the correction assembly and the prong group; and the hydraulic cylinder drives the third support to turn over by 90 degrees, so that the prong group is in a horizontal state at a first height position, and the wooden pallet is in a vertical state to wait for the stacked assembly to be sent in.

In S3, the horizontal transfer module drives the first drum conveyor line to move leftward to the turnover station and at a set distance from a surface of the wooden pallet, so that the prong group inserts into the iron pallet and is located below the stacked assembly at this time.

In S4, the range sensor detects front and rear positions of the stacked assembly on the first drum conveyor line, and the fifth motor adjusts the front and rear positions of the first drum conveyor line as a whole according to information of the position of the first drum conveyor line to make the stacked assembly aligned with a center line of the wooden pallet.

In S5, the horizontal transfer module continues to drive the first drum conveyor line to move leftward to make a left surface of the stacked assembly abut against a surface of the wooden pallet.

In S6, the correction assembly is evacuated. The third motor drives the prong group to move upward to a second height position to support the stacked assembly to make the stacked assembly separate from a surface of the iron pallet by a set height.

In S7, the horizontal transfer module drives the first drum conveyor line to move rightward to the receiving station, outputting the iron pallet by the first drum conveyor line, and inputting a next iron pallet carrying a next stacked assembly. At the same time, the hydraulic cylinder drives the third support to turn over by 90 degrees reversely to make the second drum conveyor line turned over to a horizontal state to dispose the stacked assembly on the wooden pallet, and the second drum conveyor line outputs the stacked assembly to implement outputting by turnover.

Compared with the related art, the beneficial effects of the high-rhythm and high-precision 90-degree turnover apparatus and method of the present disclosure are as follows: The first drum conveyor line configured to charge materials is disposed on a horizontal transfer module and can move between the turnover station and the receiving station; when the first drum conveyor line is at the turnover station, once the turnover module takes the stacked assembly upward and separates the stacked assembly from the iron pallet, the first drum conveyor line may immediately return to the receiving station and output the iron pallet and input the next stacked assembly; at the same time, the turnover module performs turnover actions synchronously, so that the time is greatly saved, and the overall efficiency of the turnover operation is improved; at the turnover station, the range sensor is configured to detect the front and rear positions of the stacked assembly on the first drum conveyor line, then the position adjustment mechanism is configured to adjust the front and rear positions of the first drum conveyor line, and then the front and rear positions of the stacked assembly relative to the wooden pallet on the turnover module are adjusted, so that the stacked assembly is aligned with the center line of the wooden pallet, which lays an important foundation and provides an important guarantee for the subsequent reliable and effective strapping and packaging of the stacked assembly and the wooden pallet, and the turnover accuracy is improved; in the turnover module, a motor driving the prong group to move horizontally is disposed; after the prong group turns over to a horizontal state, the motor drives the prong group to move up and down; in one aspect, the prong group may lift the stacked assembly off the surface of the iron pallet, so that the first drum conveyor line can carry the iron pallet away immediately, and the rhythm is shortened; and in another aspect, the stacked assembly may have enough space for a turnover radius, and the region adjacent to a turnover shaft may not interfere locally with the iron pallet and be squeezed by local stress, thereby improving the safety of assembly turnover.

REFERENCE LIST 100 high-rhythm and high-precision 90-degree turnover apparatus
200 iron pallet
300 stacked assembly
400 wooden pallet
500 separation plate
1 first drum conveyor line
11 first support
12 first drum
13 first motor
14 stop retaining ring
15 first cylinder
16 top rod
2 horizontal transfer module
21 first slide rail
22 rack
23 second support
24 second motor
25 gear
3 turnover module
31 hinge base
32 third support
33 hydraulic cylinder
34 second drum conveyor line
341 second drum
342 fourth motor
35 third motor
36 prong group
361 fourth cylinder
362 pressing block
363 pad
37 correction assembly
371 second cylinder
372 positioning plate
373 third cylinder
374 pressing plate
375 U-shaped stop groove
38 buffer support base
4 position adjustment mechanism
41 range sensor
42 fifth motor
43 lead screw
44 second slide rail
45 nut sleeve

DETAILED DESCRIPTION

Embodiment One

Referring to FIGS. 1 to 6, this embodiment is a high-rhythm and high-precision 90-degree turnover apparatus 100. The apparatus includes a first drum conveyor line 1 for rear and forth conveying, a horizontal transfer module 2 driving the first drum conveyor line 1 to move left and right between a receiving station and a turnover station, and a turnover module 3 disposed on a side of the turnover station.

Figure 1:
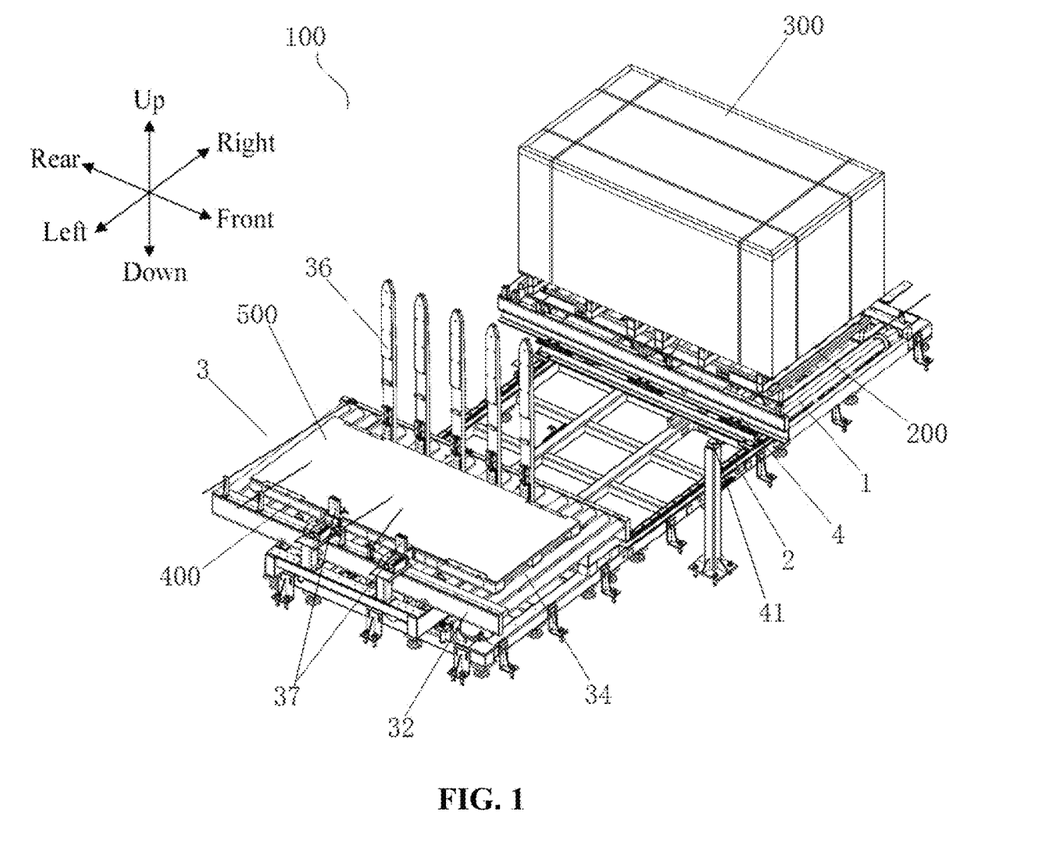
FIG. 1 is a perspective view according to an embodiment of the present disclosure.
Figure 2:
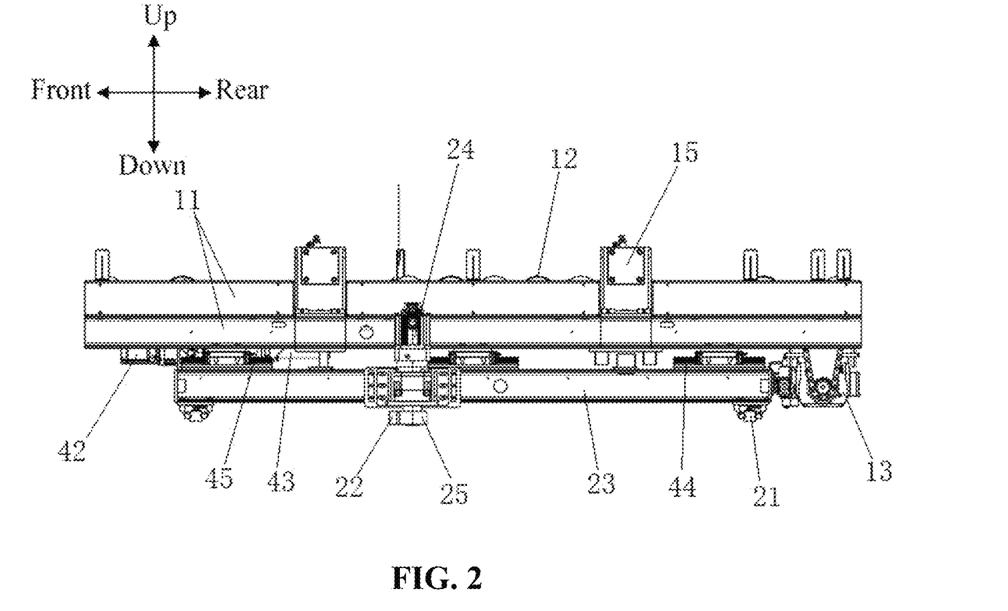
FIG. 2 is a side view illustrating the structure of a first drum conveyor line, a horizontal transfer module, and a position adjustment mechanism according to an embodiment of the present disclosure.
Figure 3:
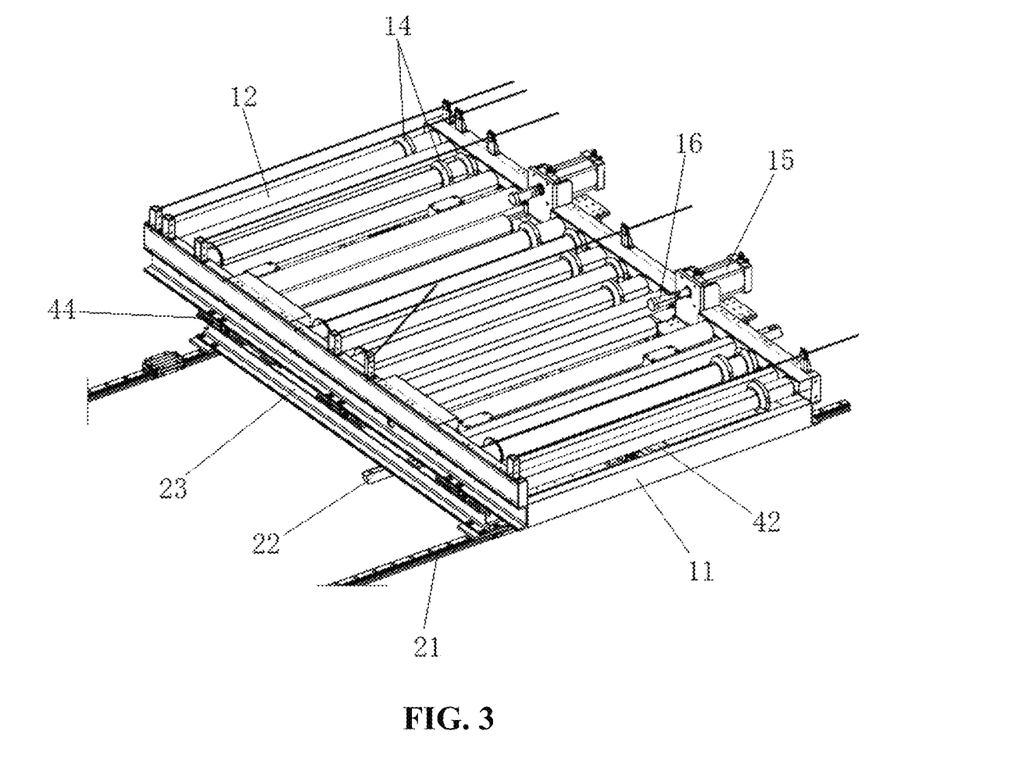
FIG. 3 is a perspective view of a first drum conveyor line, a horizontal transfer module, and a position adjustment mechanism according to an embodiment of the present disclosure.

The first drum conveyor line 1 includes a first support 11, first drums 12 arranged and rotatably disposed on the first support 11, a first motor 13 fixed on the first support 11 and driving the first drums 12 to rotate, a stop retaining ring 14 fixed on a first drum 12 and stopping the position of a side of an iron pallet 200 input to the first drum conveyor line 1, a first cylinder 15 fixed on the first support 11, and a top rod 16 driven by the first cylinder 15 and cooperating with the stop retaining ring 14 to stop the positions of two sides of the iron pallet 200. The iron pallet 200 carrying a stacked assembly 300 is input to the first drum conveyor line 1. The first drum 12 is driven by the first motor 13 to drive the iron pallet 200 and the stacked assembly 300 to move to a position as a whole and then stop. The first cylinder 15 drives the top rod 16 to push the iron pallet 200 against the stop retaining ring 14 to fix the iron pallet 200, so that the position of the stacked assembly 300 remains stable.

The horizontal transfer module 2 includes a pair of first slide rails 21 disposed in parallel, a rack 22 disposed in parallel to the first slide rails 21, a second support 23 slidably disposed on the first slide rails 21 through a sliding block, a second motor 24 fixed on the second support 23, and a gear 25 driven by the second motor 24 to rotate and meshing with the rack 22. The first drum conveyor line 1 is disposed on the second support 23. The second motor 24 drives the second support 23 to move horizontally, and then the first drum conveyor line 1 is driven to move left and right between the receiving station and the turnover station.

Figure 4:
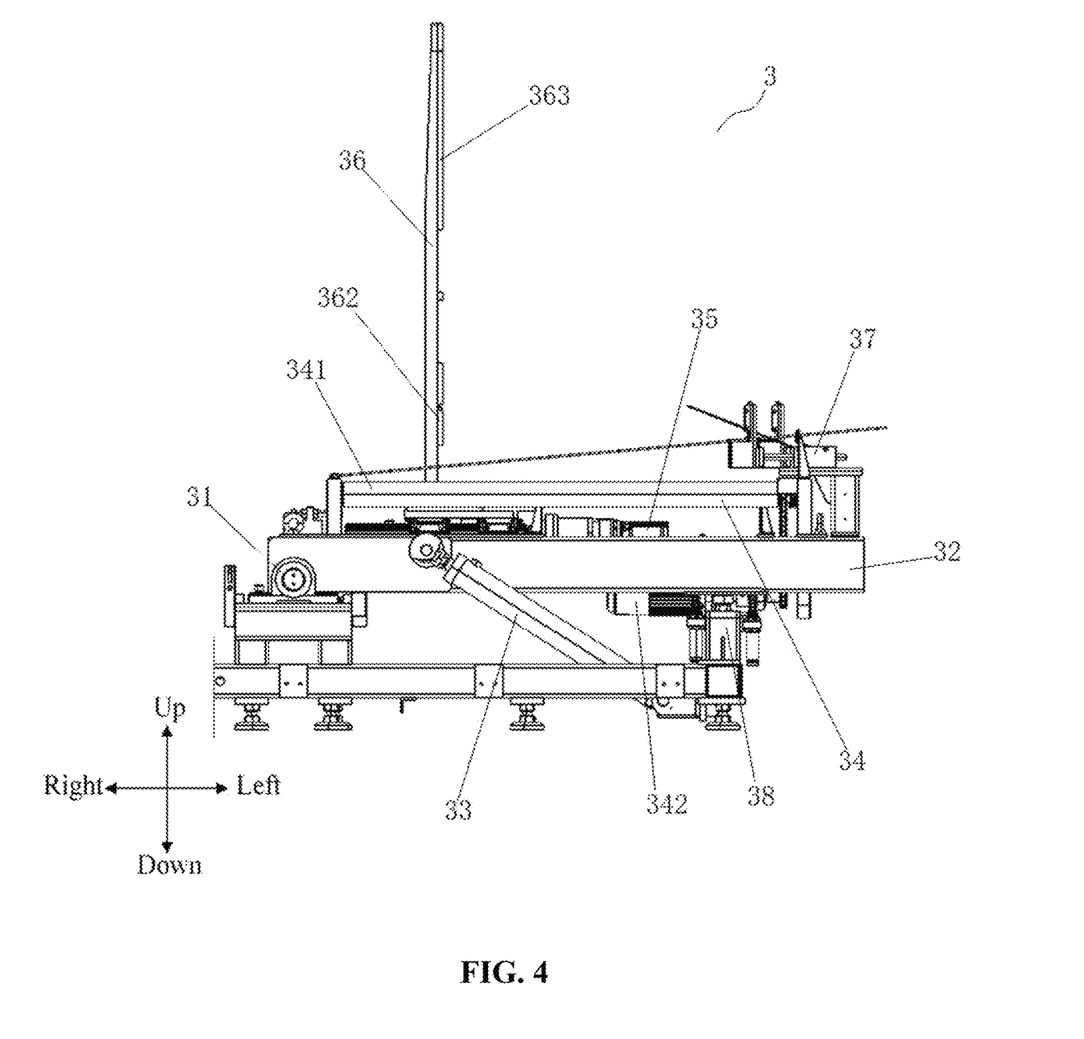
FIG. 4 is a side view illustrating the structure of a turnover module according to an embodiment of the present disclosure.

The turnover module 3 includes a hinge base 31, a third support 32 of which a side is rotatably disposed on the hinge base 31, a hydraulic cylinder 33 driving the third support 32 to rotate and turn over around the hinge base 31, a second drum conveyor line 34 disposed on the third support 32 and implementing rear and forth conveying, a third motor 35 fixed on the third support 32, a prong group 36 driven by the third motor 35 to move left and right and to be vertically arranged upward and interspersed in the second drum conveyor line 34, and a correction assembly 37 which is disposed on the third support 32 and pushes a wooden pallet 400 and a separation plate 500 on the second drum conveyor line 34 to a side of the prong group 36 for position correction.

One side of the third support 32 is rotatably disposed on the hinge seat 31, and a buffer support seat 38 supporting the third support 32 to maintain horizontality is disposed below the turnover path of the opposite side of the third support 32. The hydraulic cylinder 33 drives the third support 32 to turn over. When the stacked assembly 300 is picked up on the first drum conveyor line 1, the third support 32 is turned over to a vertical state, and the prong group 36 horizontally extends into the gap of the iron pallet 200. The third motor 35 is configured to drive the prong group 36 to move upward by a set distance. In one aspect, the stacked assembly 300 may be separated from the support surface of the iron pallet 200, so that the first drum conveyor line 1 can return to the receiving station to facilitate the output of the iron pallet 200 and the input of the next stacked assembly 300. In another aspect, when the prong group 36 is configured to lift the stacked assembly 300 upward to a set height and turn over the stacked assembly 300 by 90 degrees, the region adjacent to a turnover shaft may not interfere with the surface of the iron pallet 200 and be squeezed by local stress, thereby greatly reducing the risk of hidden breaks in the assembly.

The second drum conveyor line 34 includes several second drums 341 arranged and rotatably disposed on the third support 32 and a fourth motor 342 driving the second drums 341 to rotate.

Figure 6:
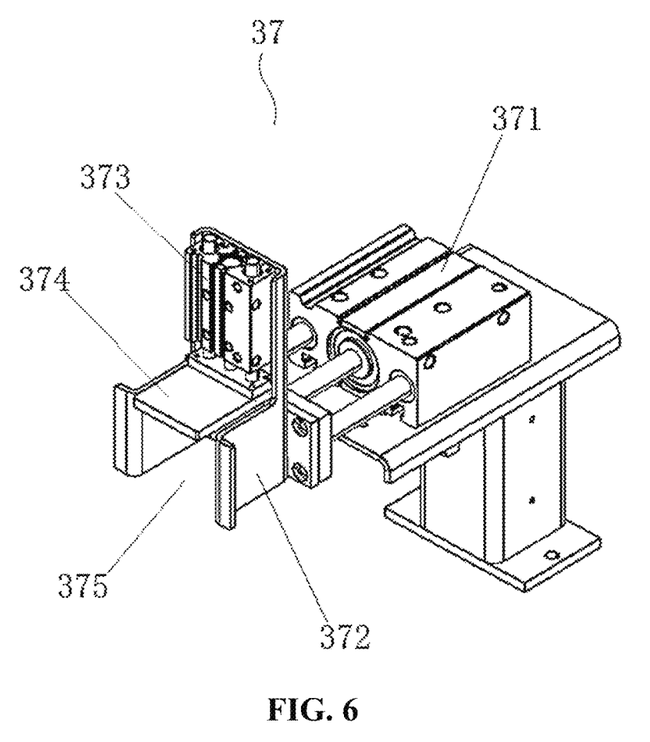
FIG. 6 is a view illustrating the structure of a correction assembly according to an embodiment of the present disclosure.

The correction assembly 37 includes a second cylinder 371 fixed on the third support 32, a positioning plate 372 driven by the second cylinder 371 to move horizontally, a third cylinder 373 fixed on the positioning plate 372, and a pressing plate 374 driven by the third cylinder 373 to move up and down. The positioning plate 372 is formed with a U-shaped stop groove 375. The U-shaped stop groove 375 stops the left and right positions of the wooden pallet 400 on the second drum conveyor line 34 from the horizontal side of the U-shaped stop groove 375. The pressing plate 374 is configured to press the separation plate 500 on the wooden pallet 400 and press a long side of the wooden pallet 400 at the same time.

Figure 5:
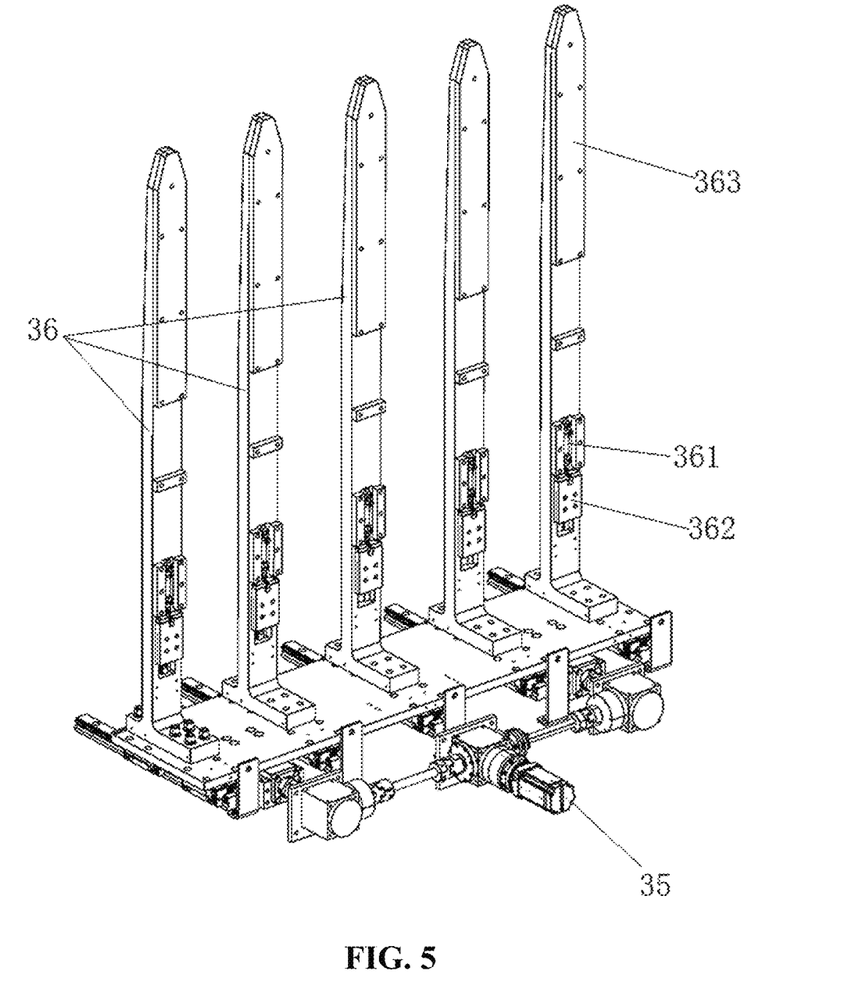
FIG. 5 is a view illustrating the structure of a prong group according to an embodiment of the present disclosure.

To ensure that the wooden pallet and the separation plate maintain stable positions and do not fall during the turnover process with the third support 32, the prong group 36 is provided with a fourth cylinder 361 and a pressing block 362 driven by the fourth cylinder 361 to move up and down and configured to press the separation plate and the wooden pallet. The pressing block 362 presses one long side of the wooden pallet through the separation plate and cooperates with the pressing plate 374 to press the opposite long side of the wooden pallet, thereby pressing and fixing the wooden pallet on the second drum conveyor line 34 and effectively preventing the third support 32 from falling during the turnover process. The prong group 36 is also provided with several pads 363 supporting the stacked assembly 300.

Due to the poor accuracy of the stop position of the stacked assembly 300 when the stacked assembly 300 is conveyed in place by the first drum conveyor line 1, when the stacked assembly 300 moves to the turnover station with the first drum conveyor line 1, the stacked assembly 300 cannot be accurately aligned with the center line of the wooden pallet 400 on the second drum conveyor line 34, which affects subsequent effective packaging. Thus, to resolve this technical problem, this embodiment designs a position adjustment mechanism 4 fine-tuning the front and rear positions of the first drum conveyor line 1 as a whole. Specifically, the position adjustment mechanism 4 includes a range sensor 41 detecting the front and rear positions of the stacked assembly 300 on the first drum conveyor line 1 at the turnover station and a fifth motor 42 adjusting the front and rear positions of the first drum conveyor line 1 according to the detection result of the range sensor 41.

The fifth motor 42 is fixed on the second support 23. The rotation end of the fifth motor 42 is provided with a lead screw 43. The second support 23 is provided with a second slide rail 44. The first support 11 is slidably disposed on the second slide rail 44 rear and forth through a sliding block. The second support 23 is provided with a nut sleeve 45 cooperating with the lead screw 43 for transmission. After the horizontal transfer module 2 drives the first drum conveyor line 1 carrying the stacked assembly 300 to move to the turnover station, the range sensor 41 detects the front position or the rear positions of the stacked assembly 300. The fifth motor 42 adjusts the front and rear positions of the first support 11 according to position information to adjust the front and rear positions of the first drum conveyor line 1 as a whole, so that the position of the stacked assembly 300 is fine-tuned. Thus, the center line of the stacked assembly 300 is aligned with the center line of the wooden pallet 400 on the second drum conveyor line 34, thereby providing a guarantee for subsequent reliable and effective packaging.

This embodiment also provides a high-rhythm and high-precision 90-degree turnover method. The method includes the steps below.

In S1, materials are charged: The iron pallet 200 carries the stacked assembly 300 and is conveyed in place by the first drum conveyor line 1, and the position of the iron pallet 200 is stopped.

In S2, the prong is turned over and waited: At the same time as step S1, a machine hand clamps the wooden pallet 400 provided with the separation plate 500 laid on the surface of the wooden pallet 400 and places the wooden pallet 400 on the second drum conveyor line 34; the correction assembly 37 and the prong group 36 are configured to cooperate to fix left and right positions of the wooden pallet 400; the pressing block 362 on the prong group 36 cooperates with the correction assembly 37 to press the separation plate 500 on the wooden pallet 400 and press and fix the wooden pallet 400 on the second drum conveyor line 34; and the hydraulic cylinder 33 drives the third support 32 to turn over 90 degrees, and the prong group 36 is in a horizontal state at a first height position, and the wooden pallet 400 is in a vertical state to wait for the stacked assembly 300 to be sent in.

In S3, the horizontal transfer module 2 drives the first drum conveyor line 1 to move leftward to the turnover station, and the first drum conveyor line 1 is set at a distance from the surface of the wooden pallet 400; and at this time, the prong group 36 extends to the iron pallet 200 and is located below the stacked assembly 300.

In S4, the range sensor 41 detects the front and rear positions of the stacked assembly 300 on the first drum conveyor line 1, and the fifth motor 42 adjusts the front and rear positions of the first drum conveyor line 1 as a whole to make the stacked assembly 300 aligned with the center line of the wooden pallet 400.

In S5, the horizontal transfer module 2 continues to drive the first drum conveyor line 1 to move leftward to make the left surface of the stacked assembly 300 abut against the surface of the wooden pallet 400.

In S6, the correction assembly 37 is evacuated, and the third motor 35 drives the prong group 36 to move upward to a second height position to support the stacked assembly 300 and make the stacked assembly 300 separate from the surface of the iron pallet 200 by a set height.

In S7, the horizontal transfer module 2 drives the first drum conveyor line 1 to move rightward to the receiving station, the iron pallet 200 is output by the first drum conveyor line 1, and an iron pallet 200 carrying the next stacked assembly 300 is input; and at the same time, the hydraulic cylinder 33 drives the third support 32 to turn over by 90 degrees reversely to make the second drum conveyor line 34 turned over to a horizontal state, and the stacked assembly 300 is located on the wooden pallet 400 and output by the second drum conveyor line 34 to implement turnover and discharge.

What is claimed is:

1. A high-rhythm and high-precision 90-degree turnover method, implemented based on a high-rhythm and high-precision 90-degree turnover apparatus, wherein the high-rhythm and high-precision 90-degree turnover apparatus comprises:
    a first drum conveyor line, configured to input a stacked assembly to be turned over, wherein the stacked assembly is placed on an iron pallet;
    a horizontal transfer module, configured to drive the first drum conveyor line to move left and right between a receiving station and a turnover station;
    a turnover module, configured to turn over the stacked assembly on the first drum conveyor line by 90 degrees at the turnover station and comprising a hinge base, a third support of which one side is rotatably disposed on the hinge base, a hydraulic cylinder configured to drive the third support to turn over, a second drum conveyor line disposed on the third support, a third motor fixed on the third support, a prong group which is configured to be driven by the third motor to move left and right and to be vertically arranged and interspersed in the second drum conveyor line, and a correction assembly which is disposed on the third support and is configured to correct a position of a wooden pallet on the second drum conveyor line; and
    a position adjustment mechanism comprising a range sensor configured to detect front and rear positions of the stacked assembly on the first drum conveyor line at the turnover station, and a fifth motor configured to adjust front and rear positions of the first drum conveyor line according to a result from the range sensor;
    the high-rhythm and high-precision 90-degree turnover method comprises following steps:
    in S1, conveying the iron pallet which carries the stacked assembly in place through the first drum conveyor line, and limiting a position of the stacked assembly;
    in S2, when S1 is being carried out, clamping a wooden pallet whose surface is paved with a separation plate, placing the wooden pallet on the second drum conveyor line, and correcting, through cooperation of the correction assembly and the prong group, left and right positions and up and down positions of the wooden pallet; and driving, by the hydraulic cylinder, the third support to turn over by 90 degrees, so that the prong group is in a horizontal state at a first height position, and the wooden pallet is in a vertical state to wait for the stacked assembly to be sent in;
    in S3, driving, by the horizontal transfer module, the first drum conveyor line to move leftward to the turnover station and at a set distance from a surface of the wooden pallet, so that the prong group inserts into the iron pallet and is located below the stacked assembly at this time;
    in S4, detecting, by the range sensor, the front and rear positions of the stacked assembly on the first drum conveyor line, and adjusting, by the fifth motor, the front and rear positions of the first drum conveyor line as a whole according to information of the positions of the first drum conveyor line to make the stacked assembly aligned with a center line of the wooden pallet;
    in S5, continuing, by the horizontal transfer module, to drive the first drum conveyor line to move leftward to make a left surface of the stacked assembly abut against a surface of the wooden pallet;
    in S6, evacuating the correction assembly, and driving, by the third motor, the prong group to move upward to a second height position to support the stacked assembly to make the stacked assembly separate from a surface of the iron pallet by a set height; and
    in S7, driving, by the horizontal transfer module, the first drum conveyor line to move rightward to the receiving station, outputting the iron pallet by the first drum conveyor line, and inputting a next iron pallet carrying a next stacked assembly; and at the same time, driving, by the hydraulic cylinder, the third support to turn over by 90 degrees reversely to make the second drum conveyor line turned over to a horizontal state to dispose the stacked assembly on the wooden pallet, and outputting, by the second drum conveyor line, the stacked assembly to implement outputting by turnover.

2. The high-rhythm and high-precision 90-degree turnover method according to claim 1, wherein the first drum conveyor line comprises a first support, first drums rotatably disposed on the first support, a first motor fixed on the first support and configured to drive the first drums to rotate, a stop retaining ring fixed on one of the first drums and configured to limit a position of a side of the iron pallet input to the first drum conveyor line, a first cylinder fixed on the first support, and a top rod configured to be driven by the first cylinder to cooperate with the stop retaining ring to limit positions of two sides of the iron pallet.

3. The high-rhythm and high-precision 90-degree turnover method according to claim 2, wherein the horizontal transfer module comprises a pair of first slide rails disposed in parallel, a rack disposed in parallel to the first slide rails, a second support slidably disposed on the first slide rails through a sliding block, a second motor fixed on the second support, and a gear which is configured to be driven by the second motor to rotate and meshes with the rack, and the first drum conveyor line is disposed on the second support.

4. The high-rhythm and high-precision 90-degree turnover method according to claim 1, wherein the one side of the third support is rotatably disposed on the hinge seat, and a buffer support seat configured to support the third support to maintain horizontality is disposed below a turnover path of another side of the third support opposite to the one side of the third support.

5. The high-rhythm and high-precision 90-degree turnover method according to claim 1, wherein the second drum conveyor line comprises a plurality of second drums rotatably arranged on the third support, and a fourth motor configured to drive the second drum to rotate.

6. The high-rhythm and high-precision 90-degree turnover method according to claim 1, wherein the correction assembly comprises a second cylinder fixed on the third support, a positioning plate configured to be driven by the second cylinder to move horizontally, a third cylinder fixed on the positioning plate, and a pressing plate configured to be driven by the third cylinder to move up and down.

7. The high-rhythm and high-precision 90-degree turnover method according to claim 1, wherein the prong group is provided with a fourth cylinder, and a pressing block which is configured to be driven by the fourth cylinder to move up and down and is configured to press a separation plate and the wooden pallet.

8. The high-rhythm and high-precision 90-degree turnover method according to claim 1, wherein the prong group is also provided with several pads configured to support the stacked assembly.

9. The high-rhythm and high-precision 90-degree turnover method according to claim 3, wherein the fifth motor is fixed on the second support, and a rotation end of the fifth motor is provided with a lead screw; and the second support is provided with a second slide rail, the first support is slidably disposed on the second slide rail rear and forth through a sliding block, and the second support is provided with a nut sleeve configured to cooperate with the lead screw for transmission.

* * * * *